(12) United States Patent
Endou et al.

(10) Patent No.: US 6,722,341 B2
(45) Date of Patent: Apr. 20, 2004

(54) FUEL INJECTION CONTROL SYSTEM AND CONTROL METHOD FOR TWO-CYCLE IN-CYLINDER DIRECT INJECTION ENGINE

(75) Inventors: Tsuneaki Endou, Numazu (JP); Jun Kawagoe, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 117 days.

(21) Appl. No.: 10/118,411

(22) Filed: Apr. 8, 2002

(65) Prior Publication Data

US 2002/0148436 A1 Oct. 17, 2002

(30) Foreign Application Priority Data

Apr. 11, 2001 (JP) ........................................ 2001-112509

(51) Int. Cl.[7] .............................. F02B 3/04; F02D 41/02
(52) U.S. Cl. ...................................... 123/305; 123/73 C
(58) Field of Search ................................ 123/73 C, 305

(56) References Cited

U.S. PATENT DOCUMENTS

| | | | |
|---|---|---|---|
| 4,807,572 A | | 2/1989 | Schlunke ................... 123/73 C |
| 5,699,766 A | * | 12/1997 | Saito ....................... 123/305 X |
| 5,720,254 A | * | 2/1998 | Yoshida et al. ............. 123/305 |
| 6,058,907 A | * | 5/2000 | Motose et al. .............. 123/305 |
| 6,293,095 B1 | | 9/2001 | Yamamoto et al. ........... 60/286 |

* cited by examiner

Primary Examiner—Tony M. Argenbright
(74) Attorney, Agent, or Firm—Pearne & Gordon LLP

(57) ABSTRACT

A fuel injection control system of a two-cycle in-cylinder direct injection engine, wherein: in a low speed area, an injection of fuel is started immediately after a scavenging port of the engine has been closed, and all fuel is injected during the time when an exhaust port is opened to stabilize an idling operation of the engine; in a middle speed area, fuel is injected even for a period of time deviated from a period between a timing of closure of the scavenging port and a timing of closure of the exhaust port; and in a high speed area, a timing of start of the fuel injection is advanced with an increase of a rotational speed of the engine thereby to inject a required quantity of fuel.

4 Claims, 4 Drawing Sheets

FUEL INJECTION CONTROL SYSTEM AND CONTROL METHOD FOR TWO-CYCLE IN-CYLINDER DIRECT INJECTION ENGINE

TECHNICAL FIELD OF THE INVENTION

The present invention relates to a fuel injection control system and a control method for a two-cycle in-cylinder direct injection engine.

BACKGROUND OF THE INVENTION

As a fuel injection control method for a two-cycle engine in which fuel is injected directly from an injector into a combustion chamber, there has been proposed a method in which fuel injection timing is controlled so that at the time of low-speed rotation of an engine, at least 80% of the fuel to be injected is injected on a compression stroke after an exhaust port has been closed, as described in U.S. Pat. No. 4,807,572.

As publicly known, the quantity of fuel injected from the injector is determined by multiplying a differential pressure between the pressure of fuel applied to the injector (fuel pressure) and the pressure of a space into which fuel is to be injected (space facing an injection port of injector) by time taken for injecting fuel by opening the injection port of injector (fuel injection time). Therefore, in order to precisely control the injection quantity of fuel, it is necessary to control both of the differential pressure between the fuel pressure and the pressure of the space into which fuel is to be injected and the fuel injection time. However, it is actually difficult to control both of these. Therefore, the injection quantity of fuel is controlled by assuming the differential pressure to be substantially constant and controlling only the fuel injection time.

In the low-speed area of the engine, in order to stabilize idling, it is desirable to precisely control the injection quantity of fuel.

In the case that most of the fuel is injected on the compression stroke after the closure of exhaust port in the low-speed area of the engine as disclosed in the conventional fuel injection control method, most of the fuel is injected in a state in which the differential pressure between the fuel pressure applied to the injector and the pressure of the space into which fuel is to be injected (space in the combustion chamber) changes every moment, so that the injection quantity of fuel cannot be controlled only by controlling the injection time. Therefore, in the case where most of the fuel is injected after the exhaust port has been closed as disclosed in the conventional control method, it is difficult to keep an air-fuel ratio in the idling state of the engine at a desirable value. At the time of idling operation of the engine, since the rotational speed of the engine is low and the inertia is low, if the injection quantity of fuel shifts from the calculated value and thus combustion becomes unstable, the influence of unstable combustion is immediately exerted on the rotation of the engine, so that there arises a problem in that the rotation in idling becomes unstable.

Also, in the conventional fuel injection control method, at the time of high-speed rotation of the engine, the timing of starting fuel injection is delayed considerably from the timing of opening the scavenging port, so that as the rotational speed increases, it becomes difficult to evenly mix the fuel with fresh air flowing into the combustion chamber. Therefore, when the engine rotates at a speed close to the upper limit in the high-speed rotation area, the air-fuel ratio distribution of mixture in the combustion chamber becomes uneven, so that the propagation velocity of flame decreases, which causes a problem that the output torque of the engine decreases.

In the case of an engine used for a vehicle operated under a condition that the running resistance is always substantially constant, for example, an outboard motor, characteristics such that the output torque decreases when the rotational speed is increased in an area close to the upper limit of high-speed area are allowed. However, in the case of an engine used for a vehicle, such as a snow mobile, operated under a condition that the running resistance is very high, it is required to provide so-called peaky characteristics such that at the time when a throttle valve is fully opened, the output torque increases as the rotational speed increases up to an area close to the upper limit of high-speed area. In the conventional control method, at the time of high-speed rotation, the air-fuel ratio distribution in the combustion chamber is uneven, and thus the ignitability of fuel is deteriorated. Therefore, it is difficult to meet such a requirement.

SUMMARY OF THE INVENTION

Accordingly, an object of the present invention is to provide a fuel injection control system and a control method for a two-cycle in-cylinder direct injection engine, in which a rotation can be kept steady at the time of idling of the engine.

Another object of the present invention is to provide a fuel injection control system and a control method for a two-cycle in-cylinder direct injection engine, in which not only the rotation can be kept steady at the time of idling of the engine, but also characteristics such that in a high-speed area, an output torque increases with increasing rotational speed of the engine at the time when a throttle valve is fully opened can be obtained.

The present invention is applied to a fuel injection control method of controlling the injection of fuel from an injector of a two-cycle in-cylinder direct injection engine having a combustion chamber, a scavenging port and an exhaust port which are opened in the combustion chamber and are opened and closed by a piston moving vertically in the combustion chamber, the injector installed so that a fuel injection port is opened in the combustion chamber, and a crankshaft connected to the piston. In the present invention, in a low-speed area in which the rotational speed of the engine takes a value lower than a set value, the fuel injection from the injector is controlled so that the fuel injection from the injector is started after the scavenging port of the engine has been closed, and the injection of all fuel is finished during the time when the exhaust port is opened; and in a middle and high-speed area in which the rotational speed of the engine takes a value exceeding the set value, the fuel injection from the injector is controlled so that fuel is injected even for a period of time deviated from the period between the timing of closure of the scavenging port and the timing of closure of the exhaust port to secure the injection time required by the engine.

In this specification, the low-speed area is defined as a rotational speed area before a load to be driven by the engine starts to operate. This low-speed area includes an idling area. Also, in the case where a crankshaft of the engine is connected to a driving shaft of the load via a centrifugal clutch, an area from the upper limit of the idling area to a clutch engagement speed (rotational speed at the time when the clutch engages) is also included in the low-speed area.

Generally, in the low-speed area of the engine, the engine is in a standby state, the load thereof being low, and an opening of a throttle valve is small, so that the quantity of fresh air flowing into the combustion chamber through the scavenging port is throttled, and thus the delivery ratio is kept at a low value. Also, in the low-speed area, since the flow velocity of scavenging air is low, fresh air scarcely blows off, so that the charging efficiency is 80% or more. Therefore, even if all fuel is injected during the time when the exhaust port is opened as described above, the fuel-air mixture scarcely blows off.

Moreover, since the pressure in the combustion chamber is substantially constant in the state in which the exhaust port is opened, the injection quantity of fuel from the injector can be controlled precisely merely by controlling the injection time.

Thereupon, as described above, in the low-speed area of the engine, if all fuel is injected during the time when the exhaust port is opened, the fuel injection quantity in the low-speed area is controlled precisely, so that the combustion of fuel can be operated properly, and thus the idling operation of the engine can be performed steadily. Also, since the combustion in the low-speed area can be operated properly, the yield of HC is decreased, so that the exhaust gas can be purified.

When a two-cycle engine is used as a driving source for a vehicle such as a snow mobile, the crankshaft of the engine is often connected to the driving shaft of the vehicle via the centrifugal clutch. When the present invention is applied to such an engine, the fuel injection is controlled as described below.

That is, in a low-speed area in which the rotational speed of the engine takes a value not higher than a first set value that is lower than a clutch engagement speed which is a rotational speed at the time when the centrifugal clutch engages, the fuel injection from the injector is controlled so that the fuel injection from the injector is started after the scavenging port of the engine has been closed, and the injection of all fuel is finished during the time when the exhaust port is opened. In a middle-speed area in which the rotational speed of the engine takes a value exceeding the first set value and not higher than a second set value that is higher than the clutch engagement speed, the fuel injection from the injector is controlled so that the timing of start of the fuel injection from the injector is delayed from the timing of closure of the scavenging port, and the timing of finish of the fuel injection is delayed from the timing of closure of the exhaust port, by which the quantity of fuel injected after the exhaust port has been closed is increased.

Also, in a high-speed area in which the rotational speed of the engine takes a value exceeding the second set value, the fuel injection from the injector is controlled so that the timing of start of the fuel injection is advanced as the rotational speed increases, and the timing of finish of the fuel injection is delayed from the timing of closure of the exhaust port. The fuel injection from the injector is controlled so that the timing of start of the fuel injection in the high-speed area is finally advanced to the timing of opening of the scavenging port or the timing immediately after the scavenging port opening timing.

If the timing of start of the fuel injection in the high-speed area is advanced to the timing of opening of the scavenging port or the timing immediately after the scavenging port opening timing, fuel is mixed with fresh air properly, and thus the output torque at the time of high-speed rotation can be increased. Therefore, the characteristics such that the output torque increases with increasing rotational speed at the time when the throttle valve is fully opened can be obtained easily.

If at the time of high-speed rotation, the position in which the fuel injection is started is advanced to a position near the position in which the scavenging port is opened as described above, the temperature of fuel-air mixture can be decreased by the latent heat of vaporization of gasoline. Therefore, the occurrence of knocking and detonation can be prevented. Also, the yield of NOx is restrained, so that exhaust gas can be purified at the time of high-speed rotation.

In an engine for driving a vehicle operated under a condition of high running resistance, such as a snow mobile, it is necessary to set the clutch engagement speed, the rotational speed at the time when the centrifugal clutch engages, at a speed in the middle-speed area of, for example, 4000 to 5000 [r/min].

In the middle-speed area of the two-cycle engine including the clutch engagement speed, it is necessary to produce a sufficient output torque to make provisions against a sudden increase in the load at the time when the centrifugal clutch engages. In the middle-speed area of the two-cycle engine, the delivery ratio is about 0.4 to 0.6, and fresh air often blows off, so that it is preferable that the injection start timing is delayed from the timing of closure of the scavenging port to inject much fuel after the exhaust port has been closed.

In the present invention, therefore, in the middle-speed area in which the rotational speed of the engine takes a value exceeding the first set value and not higher than the second set value that is higher than the first set value and a clutch engagement speed, the fuel injection from the injector is started with the timing delayed from the timing of closure of the scavenging port, and much fuel is injected after the exhaust port has been closed.

Also, in the high-speed area, the crank angle necessary for injecting a necessary quantity of fuel increases. Therefore, in the high-speed area of the engine, the timing of start of the fuel injection is advanced as the rotational speed increases, and also the timing of finish of the fuel injection is delayed from the timing of closure of the exhaust port. The timing of start of the fuel injection is finally advanced to the timing of opening of the scavenging port or the timing immediately after the scavenging port opening timing.

In the high-speed area of the engine, the time taken for one rotation of the crankshaft is short, and thus the time that can be used for mixing the injected fuel with fresh air is short. However, if the fuel injection is started at the same time that the scavenging port is opened or immediately after the opening of the scavenging port as described above, fuel is injected continuously during the time when fresh air flows into the combustion chamber through the scavenging port, whereby fuel can be mixed with fresh air properly, and thus the air-fuel ratio distribution in the combustion chamber at the ignition time can be made even. Therefore, if the above-described control is carried out, even in the vicinity of the upper limit of high-speed area, the ignitability of fuel is improved, so that the output torque of the engine can be increased, and also the peaky characteristics such that the output torque increases with increasing rotational speed can be obtained easily.

BRIEF DESCRIPTION OF THE DRAWINGS

A thorough understanding of the present invention will be gained by the description made with reference to the drawings in which.

DETAILED DESCRIPTION OF PREFERRED EMBODIMENTS

One embodiment of the present invention will now be described with reference to the accompanying drawings.

The present invention provides a fuel injection control method of controlling the injection of fuel from an injector of a two-cycle in-cylinder direct injection engine having a combustion chamber, a scavenging port and an exhaust port which are opened in the combustion chamber and are opened and closed by a piston moving vertically in the combustion chamber, and the injector installed so that a fuel injection port is opened in the combustion chamber, and a crankshaft connected to the piston.

Figure 1:
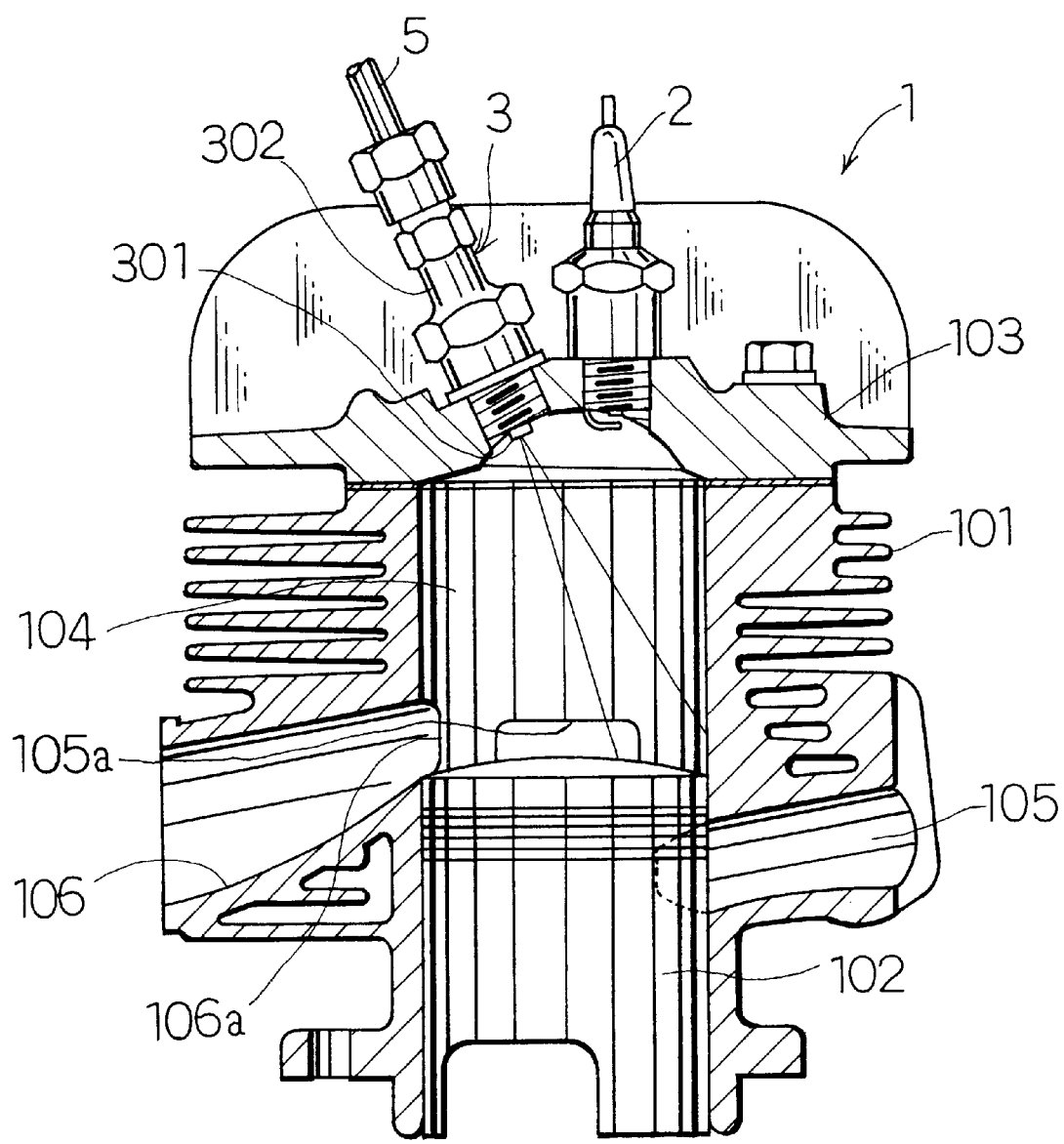
FIG. 1 is a sectional view showing one example of a construction of a two-cycle engine to which a control method in accordance with the present invention is applied.

FIG. 1 shows a typical construction of a two-cycle in-cylinder direct injection engine 1 to which the present invention is applied. In FIG. 1, reference numeral 101 denotes a cylinder block of the engine, 102 denotes a piston fitted in the cylinder block 101, and 103 denotes a cylinder head installed over the cylinder block 101. A combustion chamber 104 is formed by the cylinder block 101, the piston 102, and the cylinder head 103.

The cylinder block 101 is provided with a scavenging air passage 105 and an exhaust passage 106. One end of the scavenging air passage 105 is connected to the combustion chamber 104 through a scavenging port 105a that is opened in the combustion chamber 104, and the other end thereof is connected to a crankcase, not shown, installed under the cylinder block 101. The exhaust passage 106 has a tapered shape such that the inside diameter thereof increases gradually from one end toward the other end. One end of the exhaust passage 106 is connected to the combustion chamber 104 through an exhaust port 106a that is opened in the combustion chamber 104, and the other end thereof is connected to a muffler, not shown. The scavenging port 105a and the exhaust port 106a are provided in a state in which the positions thereof are shifted from each other at 90°.

The cylinder head 103 is fitted with an ignition plug 2 and an injector 3. The injector 3 is of a publicly known type having an injector body 302 formed with a fuel injection port 301 at the tip end and a valve mechanism housed in the injector body 302. A fuel supply port formed at the rear end of the injector body 302 is connected to a fuel pump, not shown, through a pipe 5. The valve mechanism disposed in the injector body 302 includes a needle valve for opening and closing the injection port 301, a return spring urging the needle valve on the closing position side, and a solenoid (electromagnet) for driving the needle valve against the urging force of return spring when being excited. In this injector, when a current larger than a predetermined level necessary for opening the valve is supplied to the solenoid, the needle valve is displaced to the opening position, so that the injection port is opened. During the time when a holding current having a value smaller than the current necessary for opening the valve is supplied to the solenoid, the needle valve is held at the opening position, so that the injection port is kept in the open state. For the injector 3 shown in FIG. 1, the injection port 301 thereof is installed so as to be separated from the exhaust port 106a by about 180° and from the scavenging port 105a by about 90°. The injector 3 is supplied with fuel at a predetermined pressure from the fuel pump, not shown, through the pipe 5. The pressure of this fuel (fuel pressure) is kept constant by a regulator, not shown. The injector 3 injects fuel into the combustion chamber 104 of the engine during the time when the injection port thereof is opened. The quantity of fuel injected from the injector 3 (injection quantity) is determined by the product of a difference between the pressure of fuel applied to the injector 3 (fuel pressure) and the pressure in the combustion chamber 104 times a period of time for which the injection port is opened. The solenoid of the injector 3 is connected to an injector driving circuit through a wire, not shown, by which a driving current consisting of the current necessary for opening the valve and the holding current is supplied from the driving circuit to the solenoid of injector. The injector driving circuit, having an injector driving switch that is controlled by an electronic control unit (ECU), not shown, opens the injector driving switch to inject fuel during the time when an injection command signal is sent from the ECU.

The ignition plug 2, which is connected to an ignition device through a high-voltage cord, not shown, generates spark discharge to ignite the fuel in the combustion chamber 104 when a high voltage is applied from the ignition device.

Herein, it is assumed that a snow mobile is driven by the engine 1 shown in FIG. 1, and the crankshaft (not shown) of the engine 1 is connected to a caterpillar driving shaft of the snow mobile via a centrifugal clutch.

Figure 3:
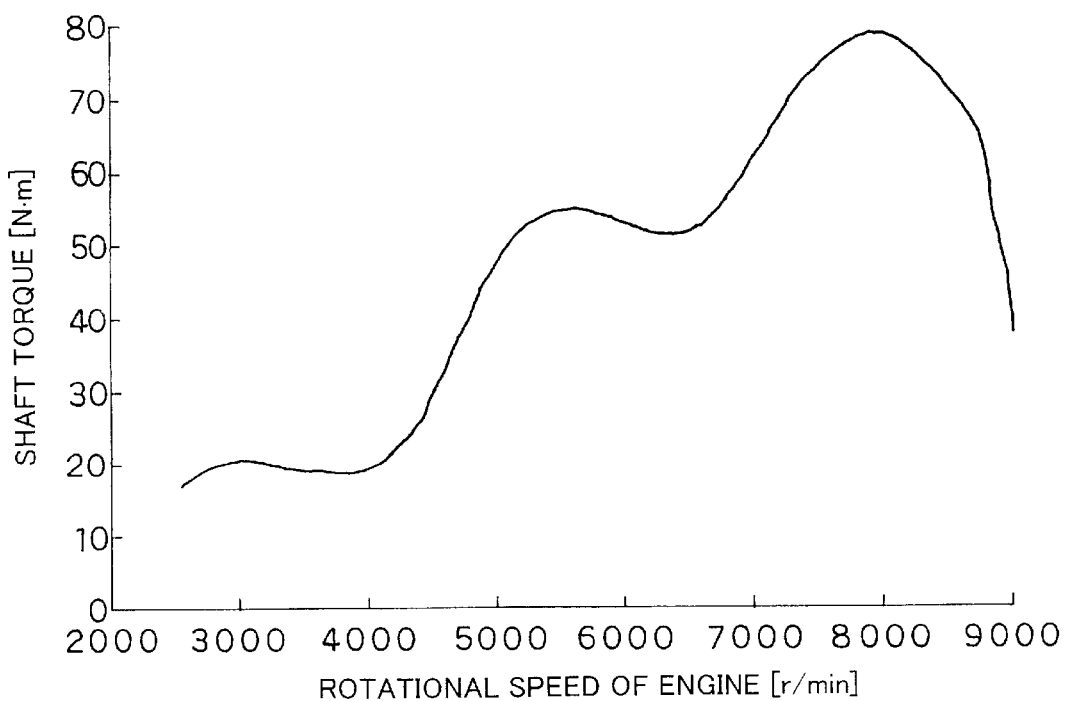
FIG. 3 is a diagram showing one example of the engine output characteristics required by a snow mobile.

For the snow mobile, since a caterpillar is driven by the engine, the load of the engine is large as compared with other vehicles using a centrifugal clutch, such as a motor scooter. Also, since the snow mobile is required to move off even when the caterpillar freezes, it is necessary to increase the driving torque just after clutch engagement as compared with other vehicles using a centrifugal clutch. Also, since the engine for snow mobile is often subjected to high running resistance by a snow surface at the time of high-speed running, it is required that there be provided output characteristics such that the output torque of the engine increases with increasing rotational speed at the time when a throttle valve is fully opened as shown in FIG. 3. In the case where the output characteristics as shown in FIG. 3 is provided, the relationship between the charging efficiency (weight ratio of the quantity of fresh air accumulating in the combustion chamber after scavenging to the stroke volume) and the delivery ratio (weight ratio of the quantity of fresh air supplied from the scavenging port to the stroke volume) of the engine is as shown in FIG. 4, and the delivery ratio is varied up to a range exceeding 1.0.

Figure 5:
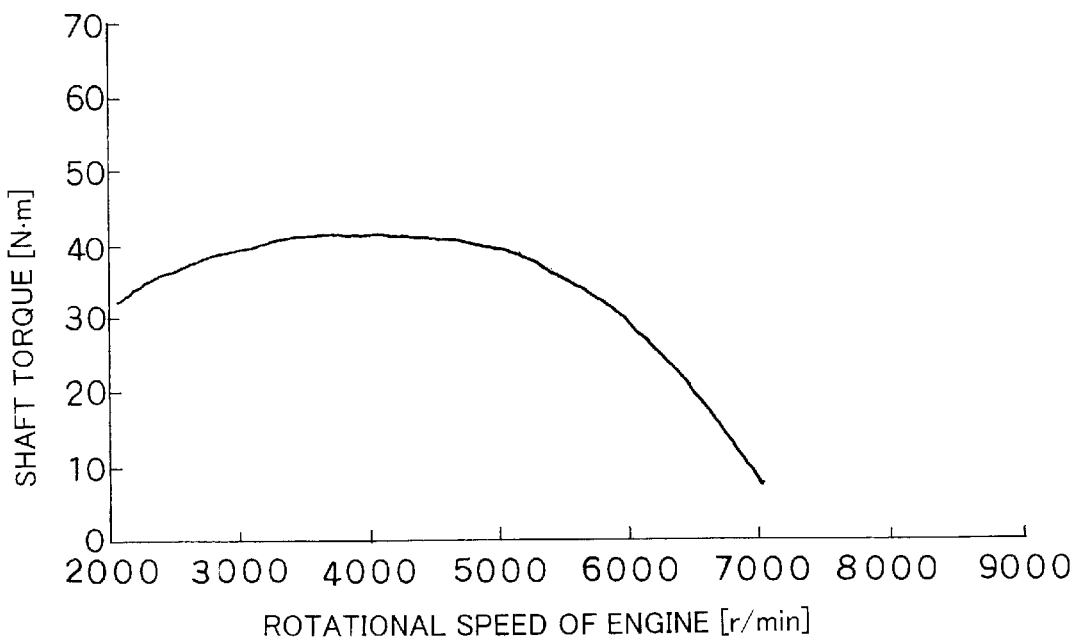
FIG. 5 is a graph showing one example of the output characteristics of a general engine at the time when a throttle valve is fully opened.
Figure 6:
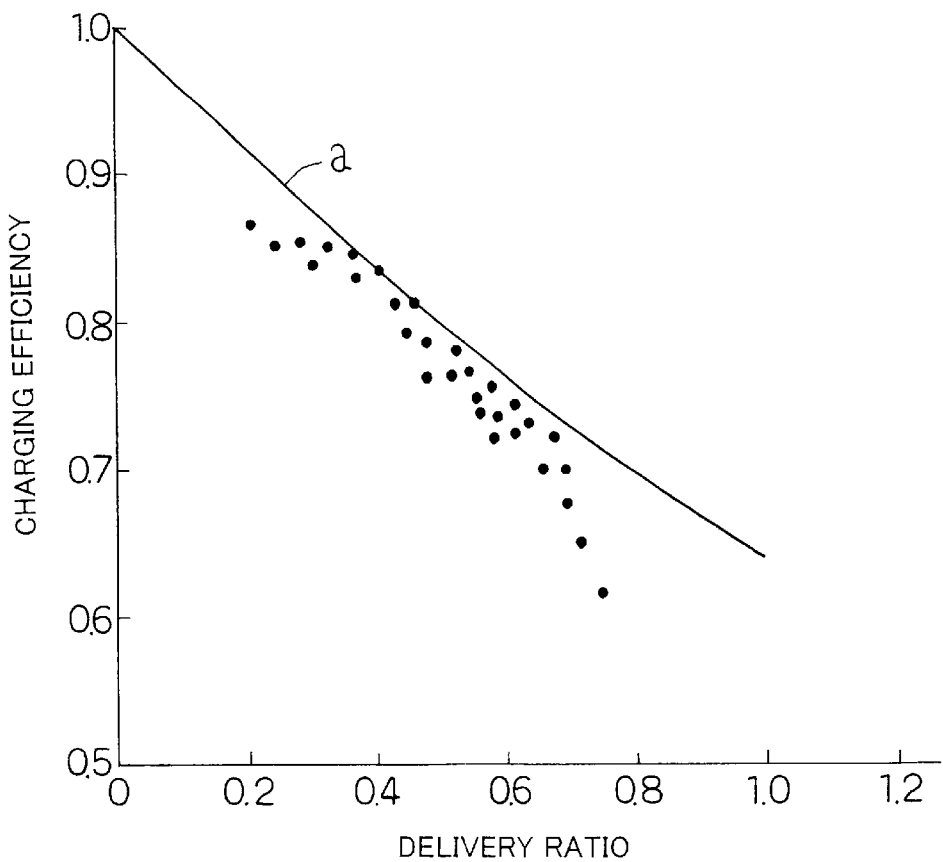
FIG. 6 is a graph showing a relationship between a charging efficiency and a delivery ratio of an engine in the case where the characteristics shown in FIG. 5 are provided.

The output characteristics of the two-cycle engine used for a motor scooter and an outboard motor at the time when the throttle valve is fully opened are characteristics such that the torque decreases with increasing rotational speed of the engine as shown in FIG. 5, and the relationship between the charging efficiency and the delivery ratio of the engine in this case is as shown in FIG. 6. In this case, the delivery ratio does not exceed 1.0.

Figure 4:
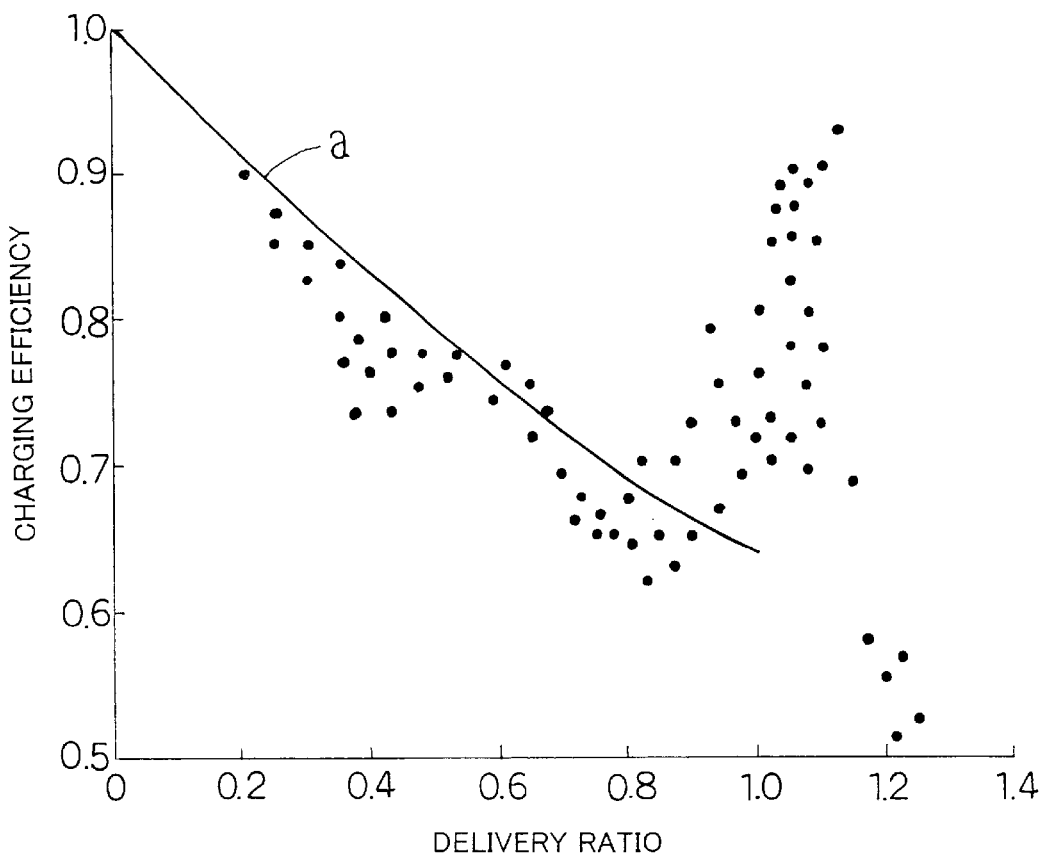
FIG. 4 is a graph showing a relationship between a charging efficiency and a delivery ratio of an engine in the case where the characteristics shown in FIG. 3 are provided.

In FIGS. 4 and 6, line a indicates the relationship between the charging efficiency and the delivery ratio at the time when fuel is mixed completely with fresh air.

Figure 2:
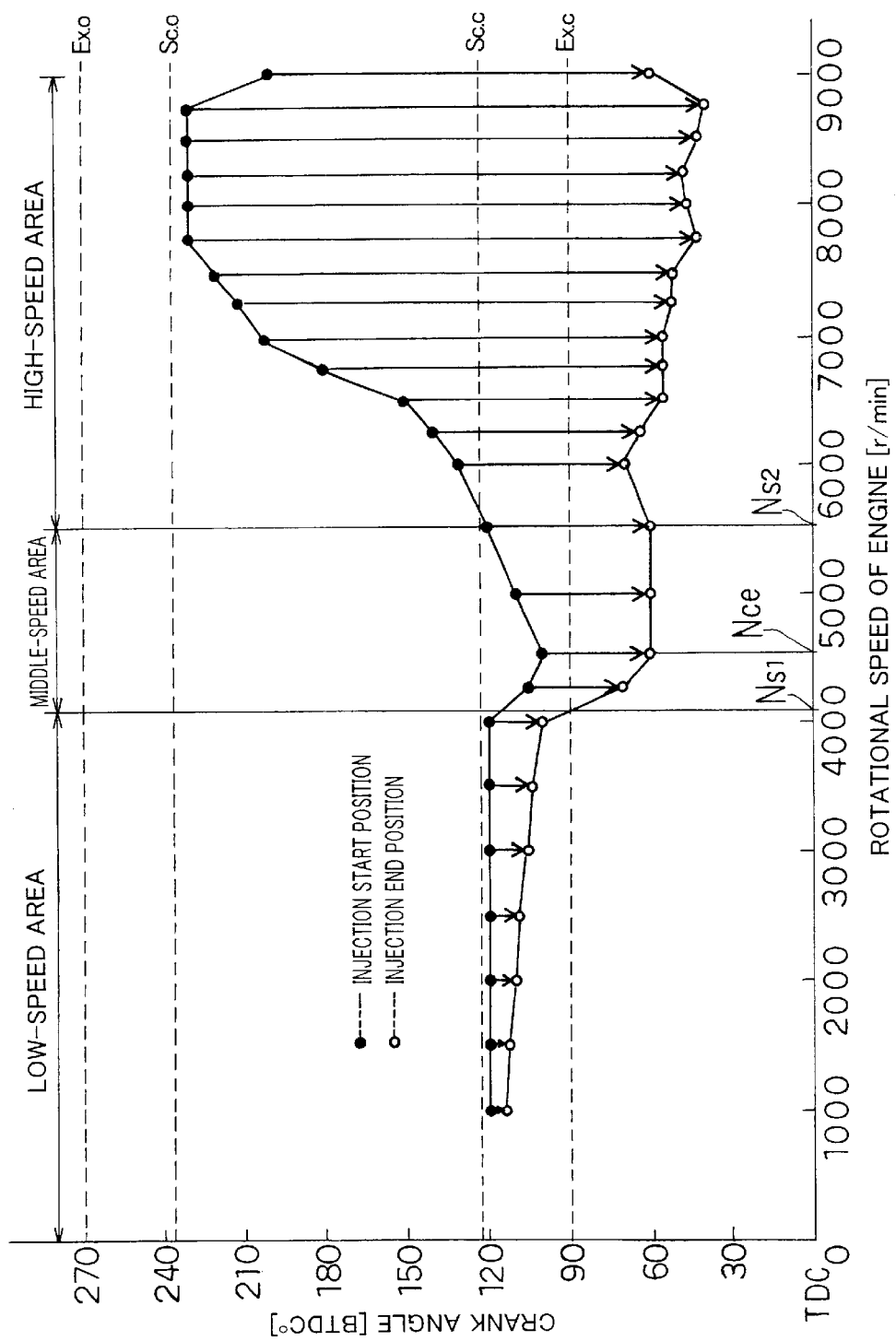
FIG. 2 is a graph showing one example of a relationship between an injection start and end positions and a rotational speed of an engine in the case where an injection of fuel from an injector of the engine shown in FIG. 1 is controlled by a control method in accordance with the present invention.

The control method in accordance with the present invention is to control the fuel injection from the injector so that the rotation of the engine in the low-speed area is stabilized, and moreover the output characteristics such that the output torque increases with increasing rotational speed as shown in FIG. 3 can be obtained. FIG. 2 shows one example of the relationship between the injection start and end positions and the rotational speed of the engine in the case where the injection of fuel from the injector 3 of the engine shown in FIG. 1 is controlled by the fuel injection control method in accordance with the present invention.

In FIG. 2, a vertical axis represents the rotation angle (crank angle) [BTDC] of the crankshaft of the engine, and a horizontal axis represents the rotational speed [r/min] of the crankshaft of the engine. The BTDC indicates that the crank angle on the vertical axis in FIG. 2 is an angle measured toward the advance angle side with the rotation angle position of the crankshaft at the time when the piston of the engine reaches the top dead center (TDC) (referred to as a top dead center position) being the reference.

In FIG. 2, black dots indicate injection start positions (rotation angle positions of the crankshaft at the time when the injection of fuel is started), and white dots indicate injection end positions (rotation angle positions of the crankshaft at the time when the injection of fuel is finished). Further, Ex.O indicates the rotation angle position of the crankshaft at the time when the exhaust port 106a is opened (timing of opening of the exhaust port), and Ex.C indicates the rotation angle position of the crankshaft at the time when the exhaust port 106a is closed (timing of closure of the exhaust port). Also, Sc.O indicates the rotation angle position of the crankshaft at the time when the scavenging port 105a is opened (timing of opening of the scavenging port), and Sc.C indicates the rotation angle position of the crankshaft at the time when the scavenging port 105a is closed.

In the case where the control method in accordance with the present invention is used, in a low-speed area in which the rotational speed of the engine 1 takes a value not higher than a first set value $N_{s1}$ (see FIG. 2), the injection of fuel from the injector is started at the time after the timing of closure of the scavenging port 105a of the engine (Sc.C in FIG. 2), and the injection of all fuel is finished during the time when the exhaust port 106a is opened. In this low-speed area, the injection start position is made constant, and the injection end position is delayed in a range not exceeding the timing of closure of the exhaust port (Ex.C) as the rotational speed increases (the position is shifted toward the top dead center side of the crankshaft). Thereby, the injection quantity of fuel is increased with increasing the rotational speed. Thus, in the present invention, all fuel is injected during the time when the exhaust port is opened.

In the two-cycle engine, in the process in which the piston rises from the bottom dead center toward the top dead center, since the volume in the cylinder decreases, some of fresh air flowing once into the combustion chamber through the scavenging port during the time when the scavenging port is opened sometimes returns to the scavenging air passage again. In the high-speed rotation area of the engine, since the velocity of scavenging air flow is high, the back flow phenomenon as described above is restrained. In the low-speed rotation area; however, since the velocity of scavenging air flow is low, the back flow phenomenon as described above takes place remarkably. Therefore, if fuel is injected before the scavenging port is closed in the low-speed rotation area, fresh air with which fuel is mixed sometimes flows backward in the scavenging air passage, which affects the air-fuel ratio of mixture not only in the present combustion cycle but also in the next combustion cycle.

In the present invention, therefore, when the rotational speed of the engine is in the low-speed area, the fuel injection from the injector is controlled so that the fuel injection is started after the scavenging port has been closed, and the injection of all fuel is finished during the time when the exhaust port is opened.

In order to inject all fuel during the time when the exhaust port is opened, it is preferable that the timing of start of the fuel injection is set immediately after the scavenging port is closed as shown in FIG. 2.

In a middle and high-speed area in which the rotational speed of the engine takes a value exceeding the set value $N_{s1}$, the fuel injection from the injector is controlled so that fuel is injected even for a period of time deviated from the period between the timing (Sc.C)of closure of the scavenging port 105a and the timing (Ex.C) of closure of the exhaust port 106a to secure the injection time required by the engine.

When the above-described control is carried out, a control system in accordance with the present invention is comprised so as to have low-speed time injection control means to control the injection of fuel from the injector so that, in the low-speed area in which the rotational speed of the engine takes a value not higher than the set value, the fuel injection from the injector is started after the scavenging port of the engine has been closed, and the injection of all fuel is finished during the time when the exhaust port is opened; and middle and high-speed time injection control means to control the injection of fuel from the injector so that, in the middle and high-speed area in which the rotational speed of the engine takes a value exceeding the set value, fuel is injected even for a period of time deviated from the period between the timing of closure of the scavenging port and the timing of closure of the exhaust port to secure the injection time required by the engine.

In the low-speed area in which the rotational speed of the engine 1 takes a value not higher than the first set value $N_{s1}$, the centrifugal clutch is not yet engaged, and the engine is in a standby state, so that the load of the engine is low. Also, in this low-speed area, since an opening degree of throttle valve is small, the quantity of fresh air flowing into the combustion chamber through the scavenging port is throttled, so that the delivery ratio is kept at a low value. Therefore, at the time when the exhaust stroke is finished, a relatively large quantity (for example, a quantity of 65 to 80% of cylinder volume) of already burnt gas remains in the combustion chamber.

Also, in the low-speed area, since the flow velocity of scavenging air is low, fresh air scarcely blows off, so that the charging efficiency becomes 80% or more. Therefore, even if all fuel is injected during the time when the exhaust port is opened as described above, the fuel-air mixture scarcely blows off.

In the case where the injection rate of injector is set so as to match with the rotational speed of the engine at the time of the highest output, the fuel injection angle (rotation angle of the crankshaft during fuel injection) in the low-speed area is about 15° at the most. Therefore, in the low-speed area of the engine, the whole quantity of fuel to be injected can be injected for a period of time from when the scavenging port is closed to when the exhaust valve is closed (period of time corresponding to the interval between Sc.C and Ex.C in FIG. 2) without problem.

Since the pressure in the combustion chamber is substantially constant in the state in which the exhaust port is opened, if all fuel is injected during the time when the exhaust port is opened as described above, the injection quantity of fuel from the injector can be controlled precisely merely by controlling the injection time.

Thereupon, if as described above, in the low-speed area of the engine, all fuel is injected during the time when the exhaust port is opened, the fuel injection quantity in the low-speed area is controlled precisely, so that the combustion of fuel can be operated properly, and thus the idling operation of the engine can be performed steadily.

Also, since the fuel injection quantity in the low-speed area is controlled precisely, the combustion can be operated properly, and thus the yield of HC is decreased, so that the exhaust gas can be purified.

Next, the fuel injection control method in the middle and high-speed area in the example shown in FIG. 2 will be described in more details.

In the middle-speed area in which the rotational speed of the engine takes a value exceeding the first set value $N_{s1}$ and not higher than a second set value $N_{s2}$ that is higher than a clutch engagement speed $N_{ce}$, the fuel injection from the injector is controlled so that the timing of start of the fuel injection from the injector is delayed from the timing of closure of the scavenging port 105a, and the timing of finish of the fuel injection is delayed from the timing of closure of the exhaust port 106a, by which the quantity of fuel injected after the exhaust port has been closed is increased.

In this middle-speed area, when the snow mobile is started, since the throttle valve is opened, the flow velocity of scavenging air increases, so that fresh air is easy to blow off. Therefore, by injecting much fuel after the exhaust valve has been closed, the blow-off is restrained. In this case, a considerable quantity of fuel is injected after the compression stroke of the engine has started. However, since the rotational speed of the engine has already increased to some extent and the inertia has increased, even if the fuel injection quantity somewhat shifts from the calculated value, the engine rotates steadily.

In a high-speed area in which the rotational speed of the engine exceeds the second set value $N_{s2}$, the timing of start of the fuel injection is advanced as the rotational speed increases, and the timing of finish of the fuel injection is delayed from the timing of closure of the exhaust port 106a to meet the requirement of the engine. The fuel injection from the injector is controlled so that the timing of start of the fuel injection in the high-speed area is finally advanced to the timing of opening of the scavenging port 105a or the timing immediately after the scavenging port opening timing.

In the high-speed area of the engine, the time taken for one rotation of the crankshaft is short, and thus the time that can be used for mixing the injected fuel with fresh air is short. However, if the fuel injection is started at the same time that the scavenging port 105a is opened or immediately after the opening of the scavenging port 105a as described above, fuel is injected continuously during the time when fresh air flows into the combustion chamber 104 through the scavenging port 105a, whereby fuel can be mixed with fresh air properly, and thus the air-fuel ratio distribution in the combustion chamber at the ignition time can be made even. Therefore, if the above-described control is carried out, even in the vicinity of the upper limit of the high-speed area, the ignitability of fuel is improved, so that the output torque of the engine can be increased, and also the characteristics such that the output torque increases with increasing rotational speed at the time when the throttle valve is fully opened as shown in FIG. 3 can be obtained easily.

Furthermore, if the position in which the fuel injection is started is advanced to a position near the position in which the scavenging port is opened as described above, the temperature of fuel-air mixture can be decreased by the latent heat of vaporization of gasoline. Therefore, the occurrence of knocking or detonation can be prevented. Also, by decreasing the temperature of fuel-air mixture, the ultimate temperature at the time of the combustion is decreased, so that the yield of NOx can be restrained, and therefore exhaust gas can be purified at the time of high-speed rotation.

In the case where the control is carried out by dividing the area in which the rotational speed of the engine exceeds the first set value into the middle-speed area and the high-speed area, the control system in accordance with the present invention is comprised so as to have low-speed time injection control means to control the injection of fuel from the injector so that, in the low-speed area in which the rotational speed of the engine takes a value not higher than the first set value that is lower than the clutch engagement speed which is the rotational speed at the time when the centrifugal clutch engages, the fuel injection from the injector is started after the scavenging port of the engine has been closed, and the injection of all fuel is finished during the time when the exhaust port is opened; middle-speed time injection control means to control the injection of fuel from the injector so that, in the middle-speed area in which the rotational speed of the engine takes a value exceeding the first set value and not higher than the second set value that is higher than the clutch engagement speed, the timing of start of the fuel injection from the injector is delayed from the timing of closure of the scavenging port, and the timing of finish of the fuel injection is delayed from the timing of closure of the exhaust port, by which the quantity of fuel injected after the exhaust port has been closed is increased; and high-speed time injection control means to control the injection of fuel from the injector so that, in the high-speed area in which the rotational speed of the engine takes a value exceeding the second set value, the timing of start of the fuel injection is advanced as the rotational speed increases, and the timing of finish of the fuel injection is delayed from the timing of closure of the exhaust port.

What is claimed is:

1. A fuel injection control system of a two-cycle in-cylinder direct injection engine, which controls the injection of fuel from an injector of the two-cycle in-cylinder direct injection engine having a combustion chamber, a scavenging port and an exhaust port which are opened in said combustion chamber and are opened and closed by a piston moving vertically in said combustion chamber, the injector installed so that a fuel injection port is opened in said combustion chamber, and a crankshaft connected to said piston, comprising:

low-speed time injection control means to control the injection of fuel from the injector so that, in a low-speed area in which the rotational speed of said engine takes a value not higher than a set value, the fuel injection from said injector is started after the scavenging port of said engine has been closed, and the injection of all fuel is finished during the time when said exhaust port is opened; and middle and high-speed time injection control means to control the injection of fuel from the injector so that, in a middle and high-speed area in which the rotational speed of said engine takes a value exceeding said set value, fuel is injected even for a period of time deviated from the period between the timing of closure of said scavenging port and the timing of closure of said exhaust port to secure the injection time required by said engine.

2. A fuel injection control system of a two-cycle in-cylinder direct injection engine, which controls the injection of fuel from an injector of the two-cycle in-cylinder direct injection engine having a combustion chamber, a scavenging port and an exhaust port which are opened in said combustion chamber and are opened and closed by a piston moving vertically in said combustion chamber, the injector installed so that a fuel injection port is opened in said combustion chamber, and a crankshaft connected to said piston, said crankshaft being connected to a driving shaft of a vehicle via a centrifugal clutch, comprising:

low-speed time injection control means to control the injection of fuel from the injector so that, in a low-speed area in which the rotational speed of said engine takes a value not higher than a first set value that is lower than a clutch engagement speed, a rotational speed at which said centrifugal clutch engages, the fuel injection from said injector is started after the scavenging port of said engine has been closed, and the injection of all fuel is finished during the time when said exhaust port is opened;

middle-speed time injection control means to control the injection of fuel from the injector so that, in a middle-speed area in which the rotational speed of said engine takes a value exceeding said first set value and not higher than a second set value that is higher than said clutch engagement speed, the timing of start of the fuel injection from said injector is delayed from the timing of closure of said scavenging port, and the timing of finish of the fuel injection is delayed from the timing of closure of said exhaust port, by which the quantity of fuel injected after said exhaust port has been closed is increased; and high-speed time injection control means to control the injection of fuel from the injector so that, in a high-speed area in which the rotational speed of said engine takes a value exceeding said second set value, the timing of start of the fuel injection is advanced as the rotational speed increases, and the timing of finish of the fuel injection is delayed from the timing of closure of said exhaust port.

3. A fuel injection control method for a two-cycle in-cylinder direct injection engine, which controls the injection of fuel from an injector of the two-cycle in-cylinder direct injection engine having a combustion chamber, a scavenging port and an exhaust port which are opened in said combustion chamber and are opened and closed by a piston moving vertically in said combustion chamber, the injector installed so that a fuel injection port is opened in said combustion chamber, and a crankshaft connected to said piston, wherein, in a low-speed area in which the rotational speed of said engine takes a value not higher than a set value, the fuel injection from said injector is controlled so that the fuel injection from said injector is started after the scavenging port of said engine has been closed, and the injection of all fuel is finished during the time when said exhaust port is opened; and in a middle and high-speed area in which the rotational speed of said engine takes a value exceeding said set value, the fuel injection from said injector is controlled so that fuel is injected even for a period of time deviated from the period between the timing of closure of said scavenging port and the timing of closure of said exhaust port to secure the injection time required by said engine.

4. A fuel injection control method for a two-cycle in-cylinder direct injection engine, which controls the injection of fuel from an injector of the two-cycle in-cylinder direct injection engine having a combustion chamber, a scavenging port and an exhaust port which are opened in said combustion chamber and are opened and closed by a piston moving vertically in said combustion chamber, the injector installed so that a fuel injection port is opened in said combustion chamber, and a crankshaft connected to said piston, said crankshaft being connected to a driving shaft of a vehicle via a centrifugal clutch, wherein, in a low-speed area in which the rotational speed of said engine takes a value not higher than a first set value that is lower than a clutch engagement speed, a rotational speed at the time when said centrifugal clutch engages, the fuel injection from said injector is controlled so that the fuel injection from said injector is started after the scavenging port of said engine has been closed, and the injection of all fuel is finished during the time when said exhaust port is opened;

wherein, in a middle-speed area in which the rotational speed of said engine takes a value exceeding said first set value and not higher than a second set value that is higher than said clutch engagement speed, the fuel injection from said injector is controlled so that the timing of start of the fuel injection from said injector is delayed from the timing of closure of said scavenging port, and the timing of finish of the fuel injection is delayed from the timing of closure of said exhaust port, by which the quantity of fuel injected after said exhaust port has been closed is increased;

wherein, in a high-speed area in which the rotational speed of said engine takes a value exceeding said second set value, the fuel injection from said injector is controlled so that the timing of start of the fuel injection is advanced as the rotational speed increases, and the timing of finish of the fuel injection is delayed from the timing of closure of said exhaust port; and wherein the timing of start of the fuel injection in said high-speed area is finally advanced to the timing of opening of the scavenging port or the timing immediately after the scavenging port opening timing.

* * * * *